Feb. 5, 1929.
R. B. BENJAMIN
1,700,757
PANEL BOARD AND SWITCH CONSTRUCTION
Filed Feb. 11, 1926    10 Sheets-Sheet 1
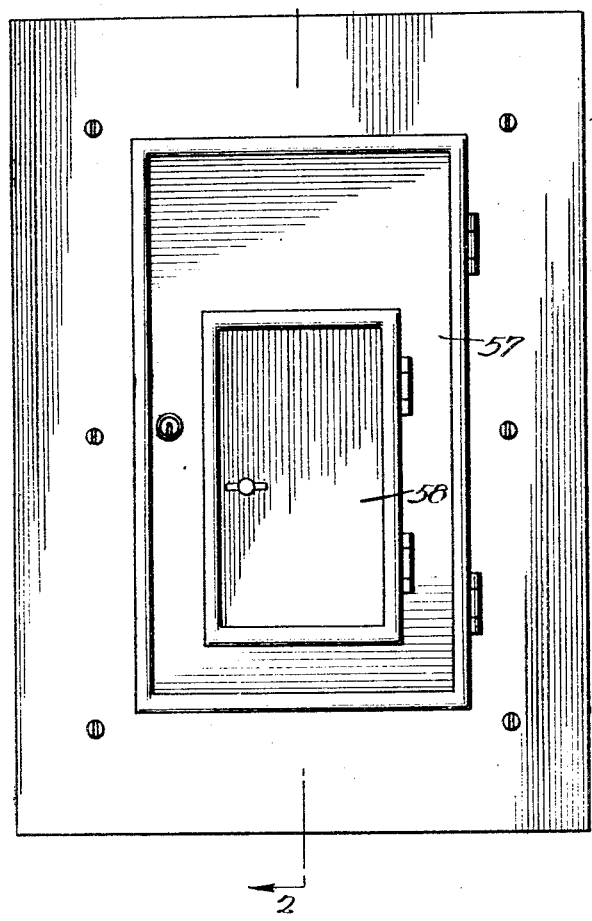
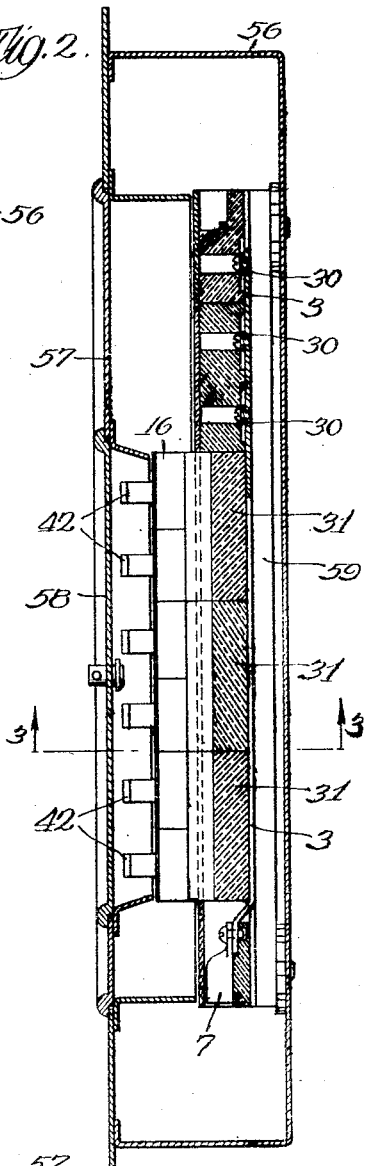
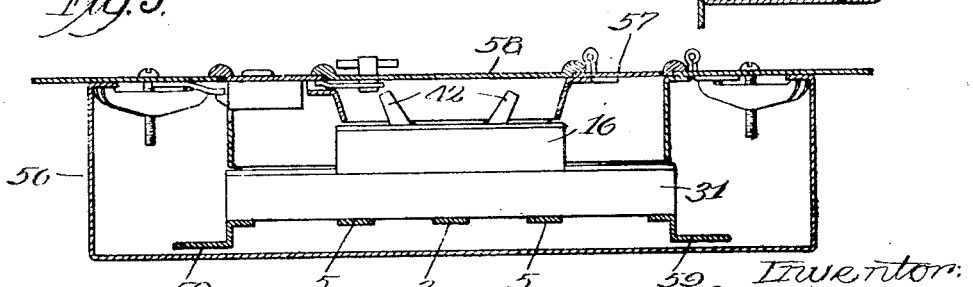

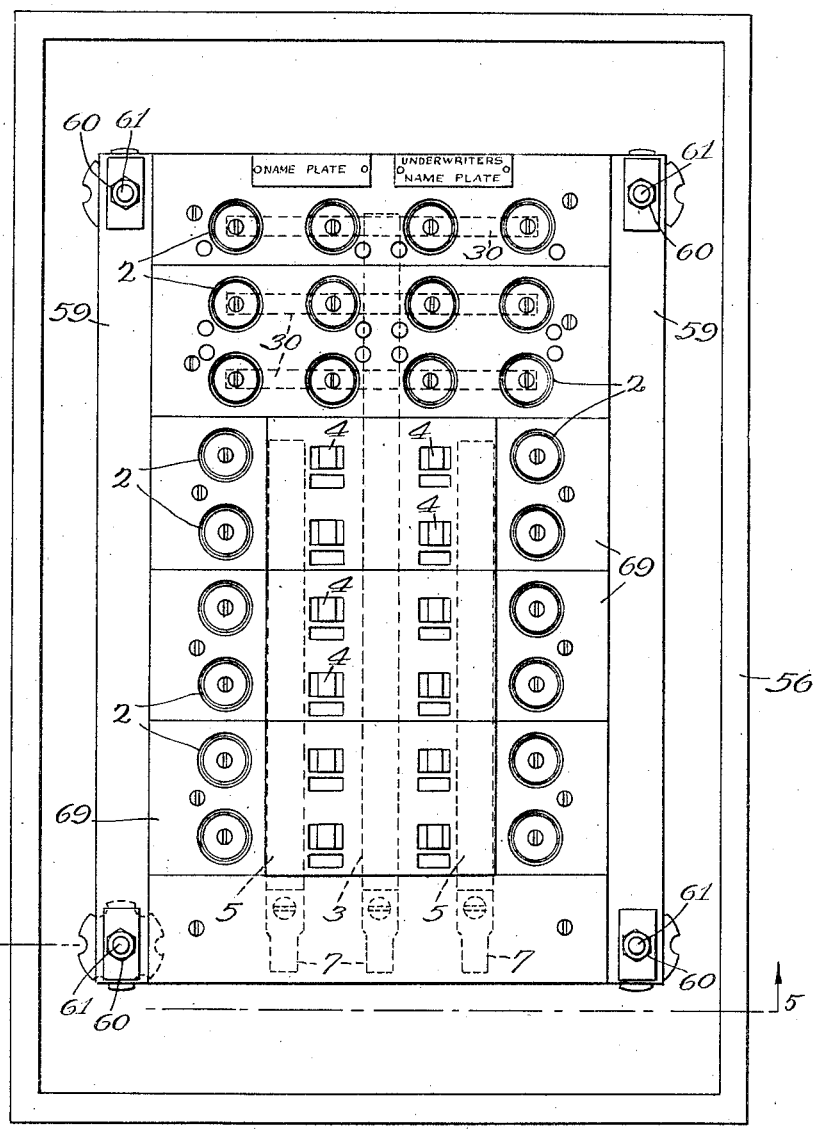
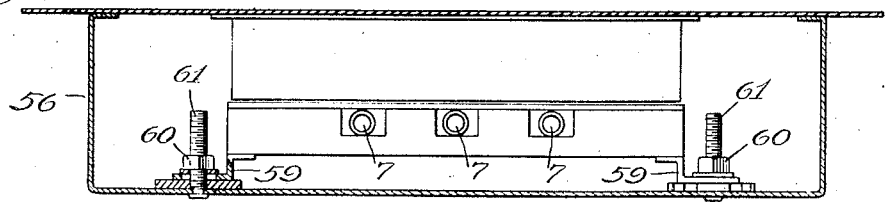

Feb. 5, 1929.
R. B. BENJAMIN
1,700,757
PANEL BOARD AND SWITCH CONSTRUCTION
Filed Feb. 11, 1926    10 Sheets-Sheet 3
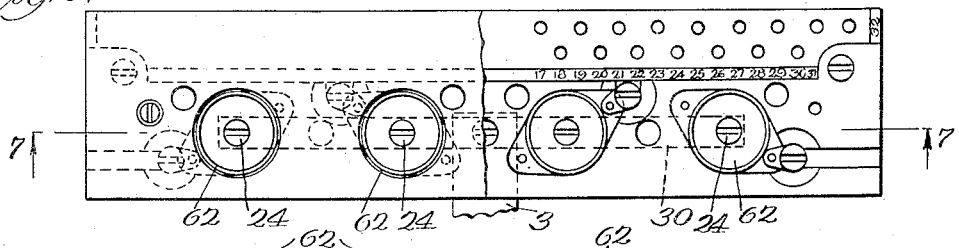
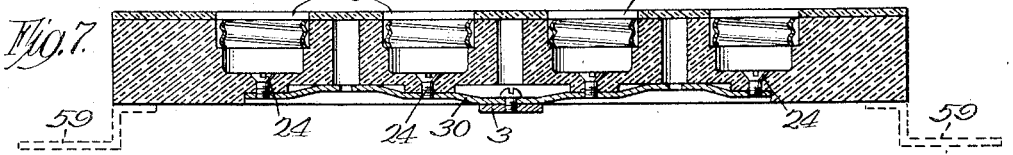
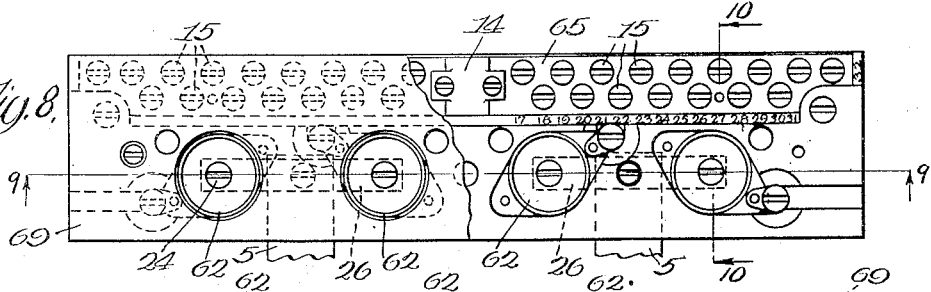
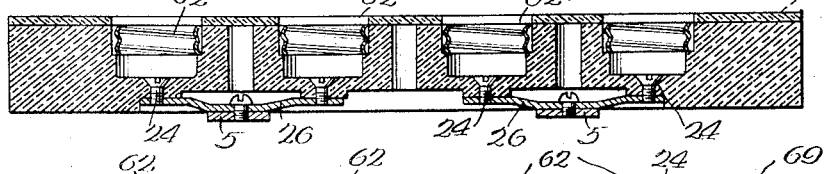
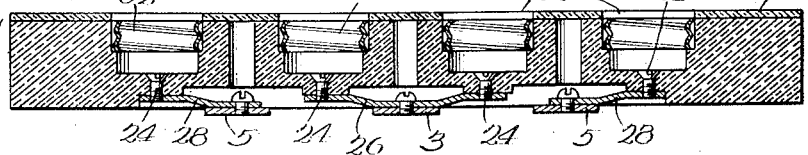
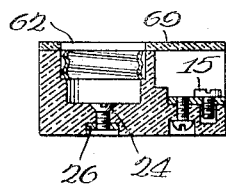
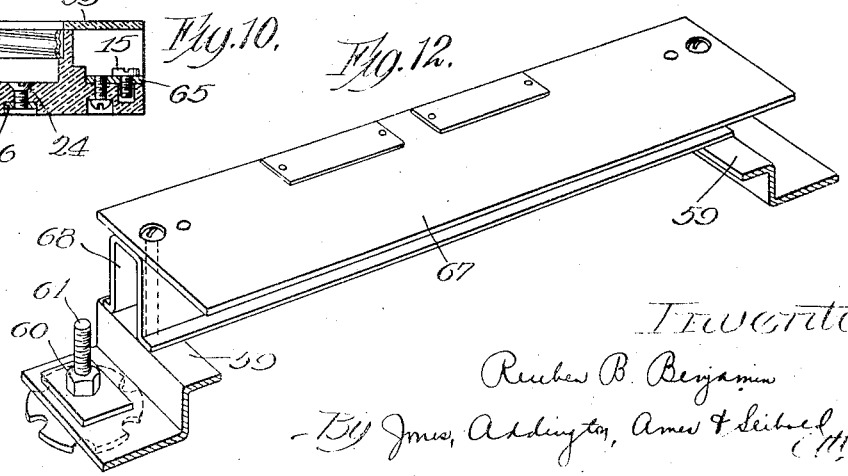

Feb. 5, 1929. 1,700,757
R. B. BENJAMIN
PANEL BOARD AND SWITCH CONSTRUCTION
Filed Feb. 11, 1926  10 Sheets-Sheet 4
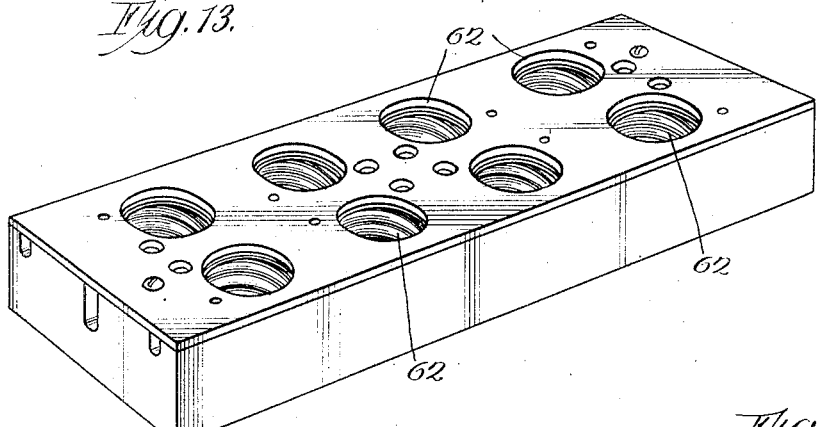
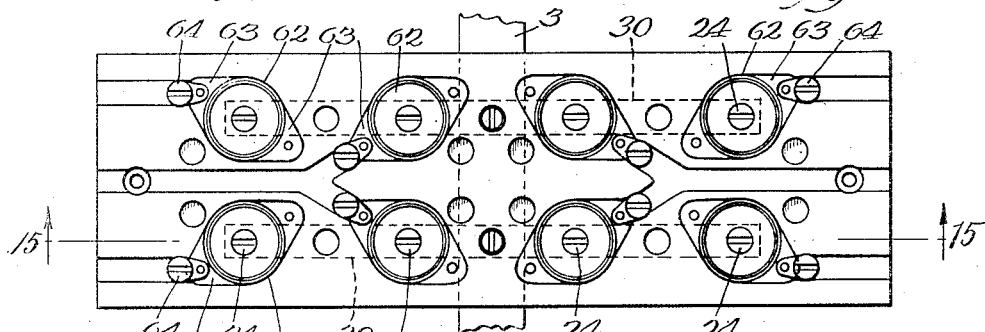
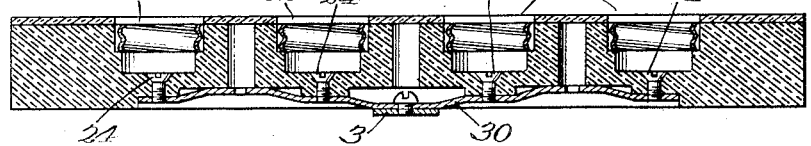
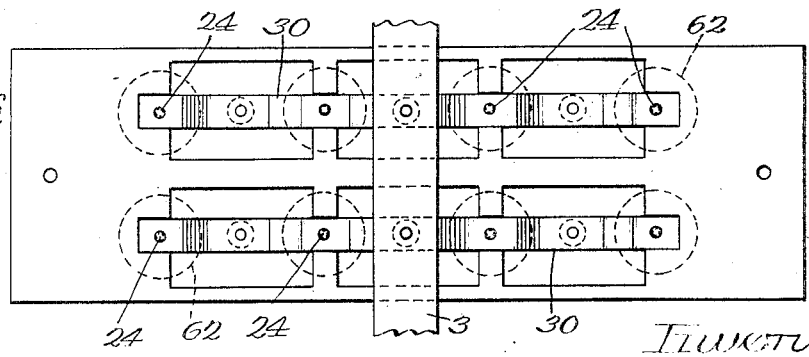

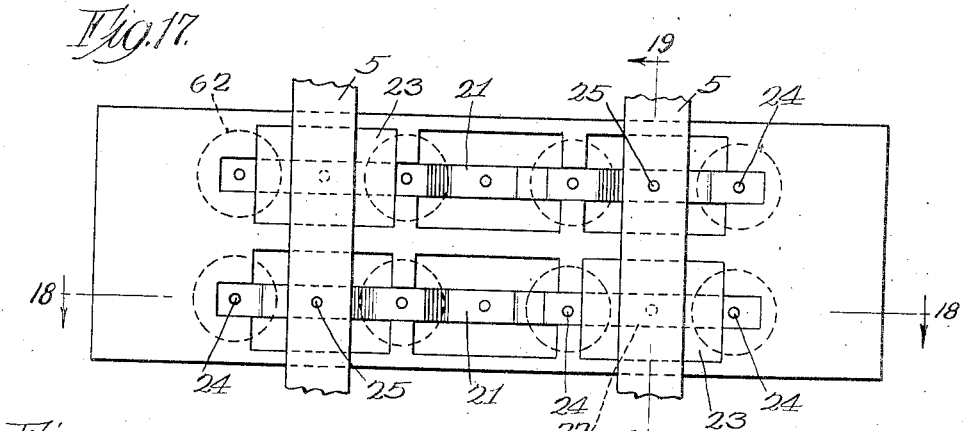
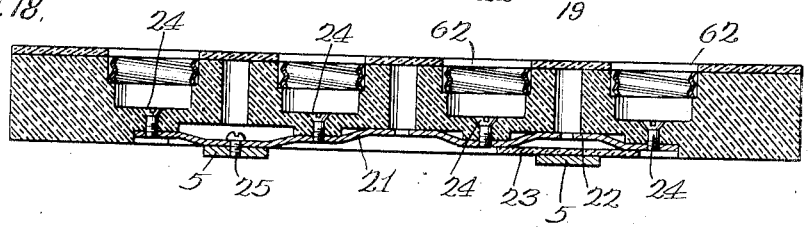
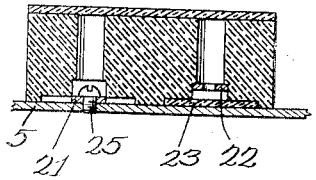
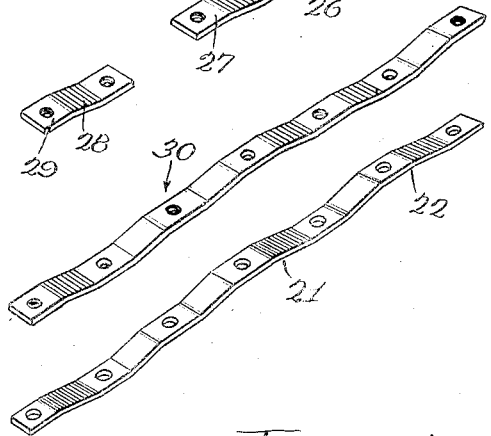

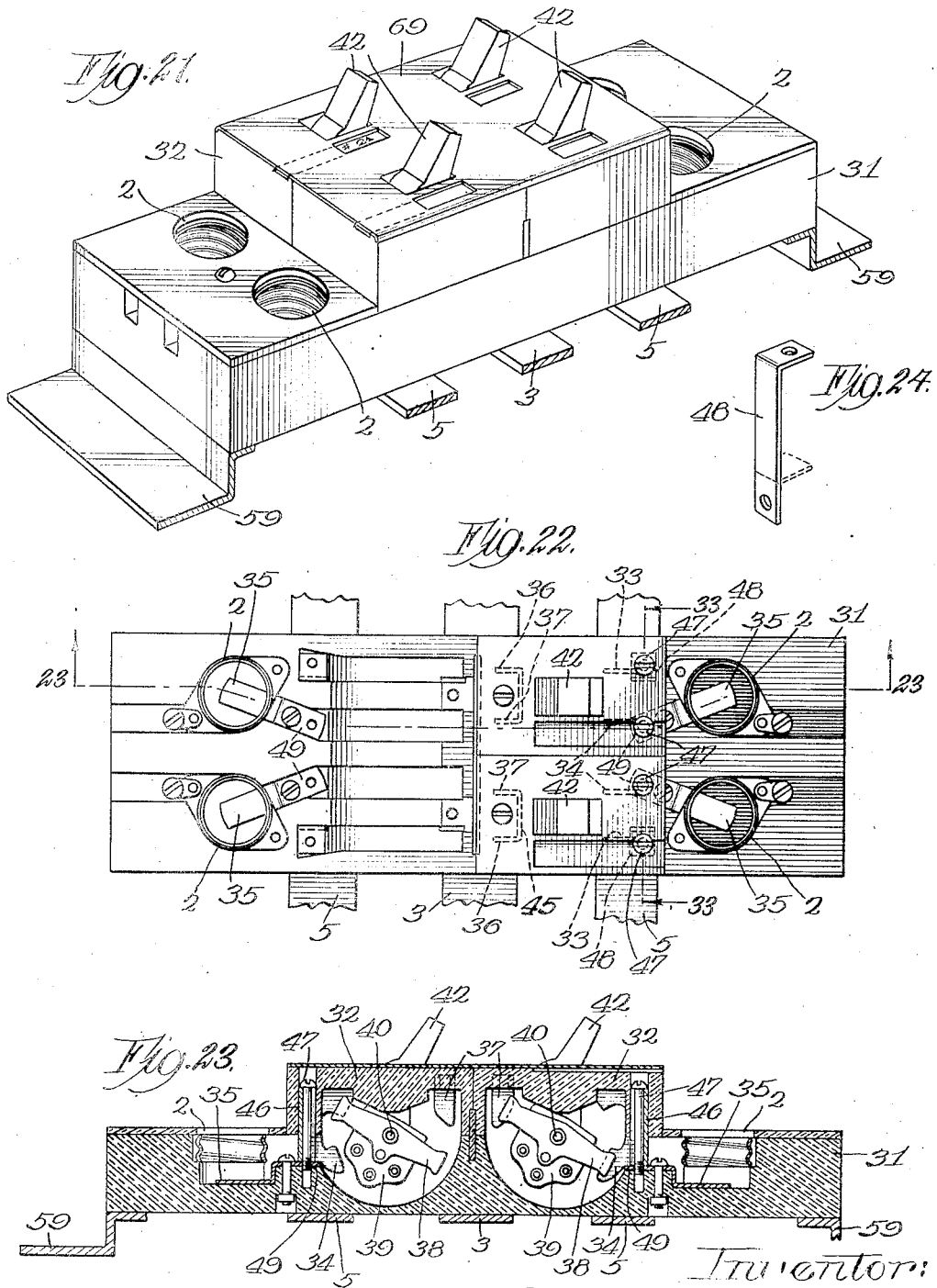

Feb. 5, 1929.
R. B. BENJAMIN
1,700,757
PANEL BOARD AND SWITCH CONSTRUCTION
Filed Feb. 11, 1926     10 Sheets-Sheet 7
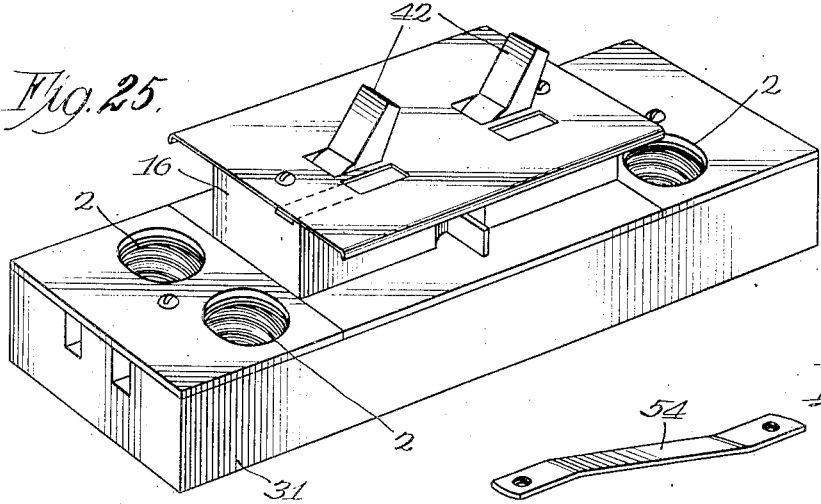
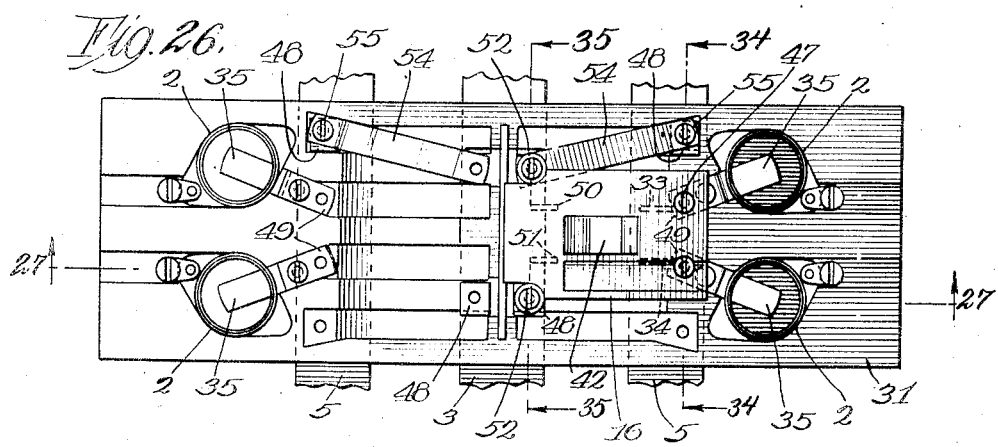
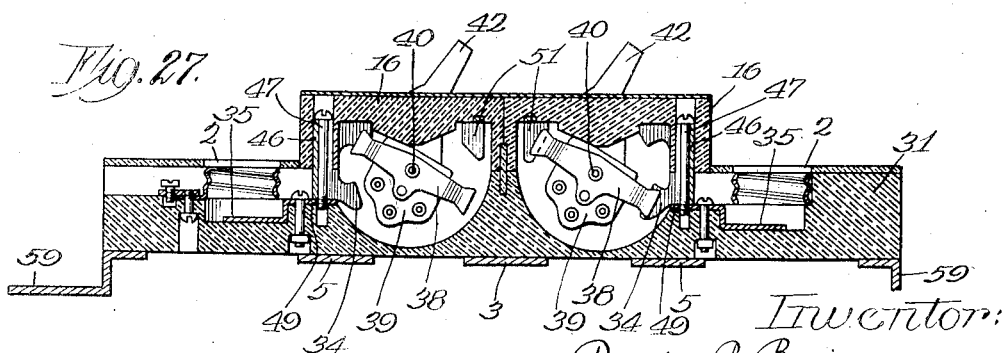

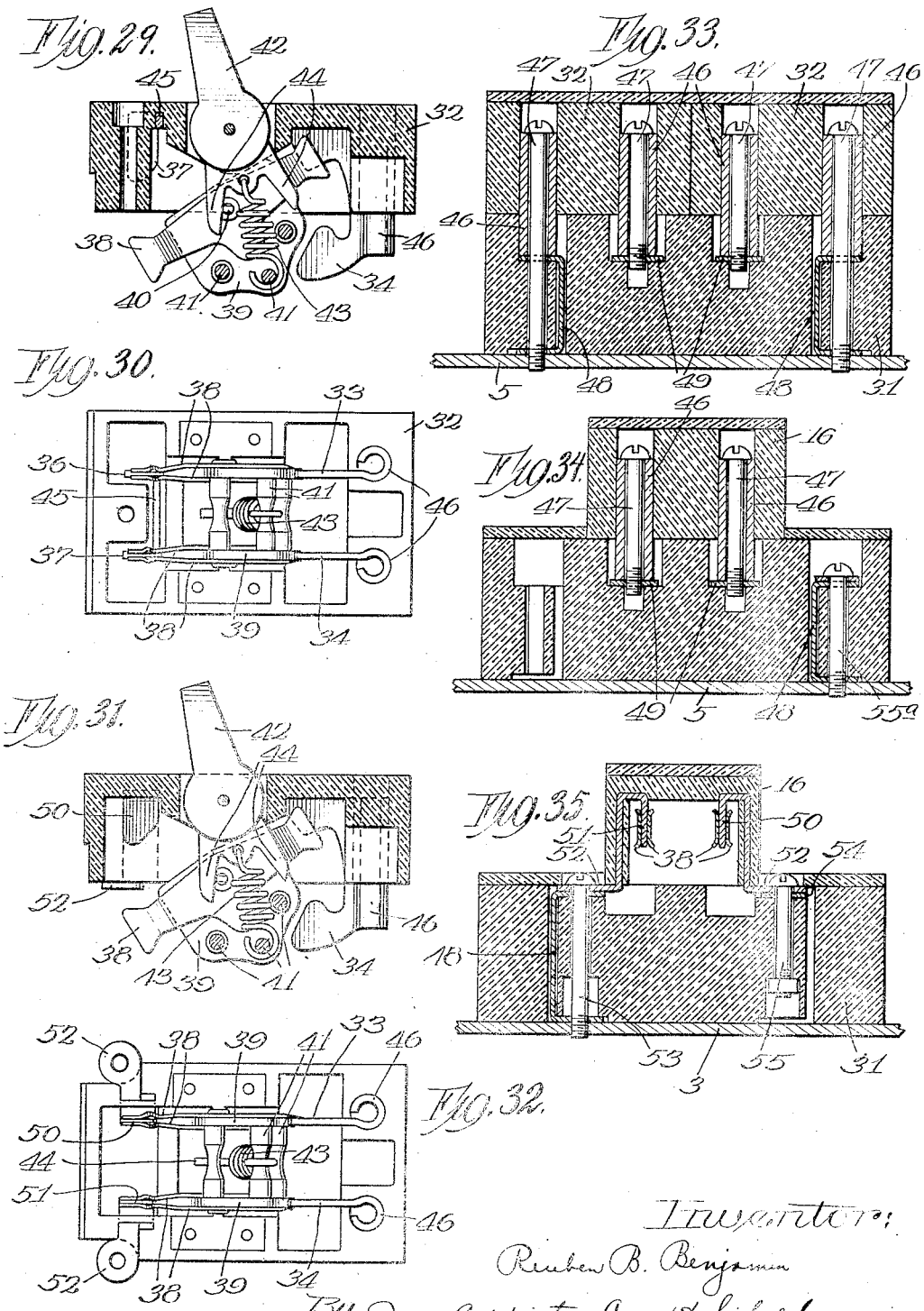

Feb. 5, 1929.
R. B. BENJAMIN
PANEL BOARD AND SWITCH CONSTRUCTION
Filed Feb. 11, 1926  10 Sheets-Sheet 9
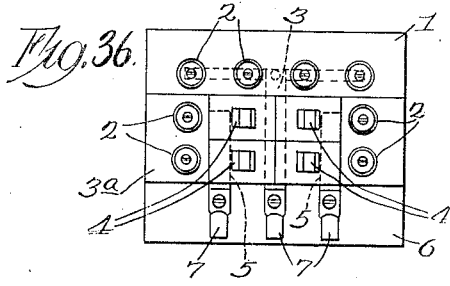
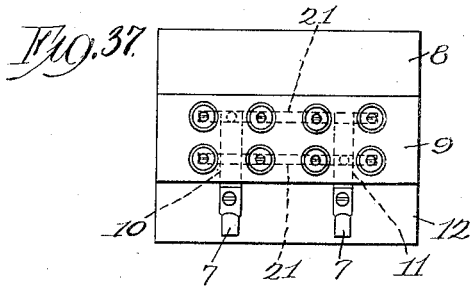
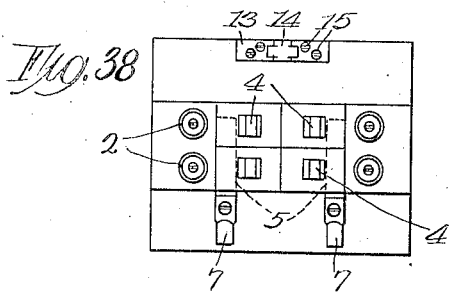
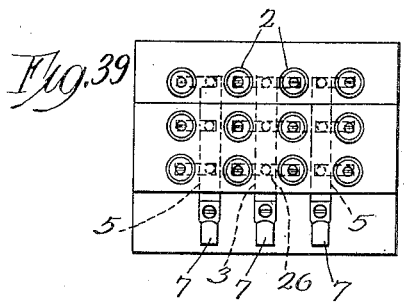
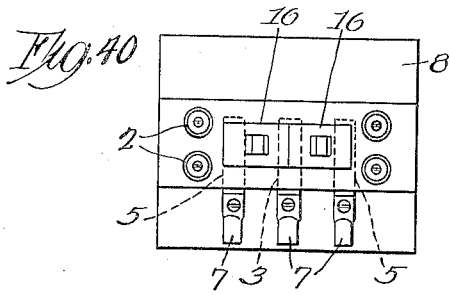
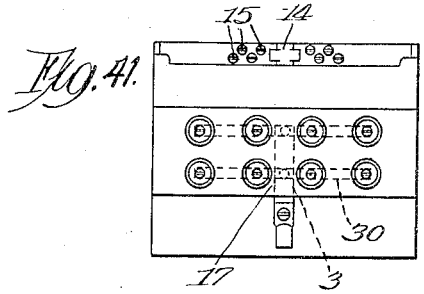
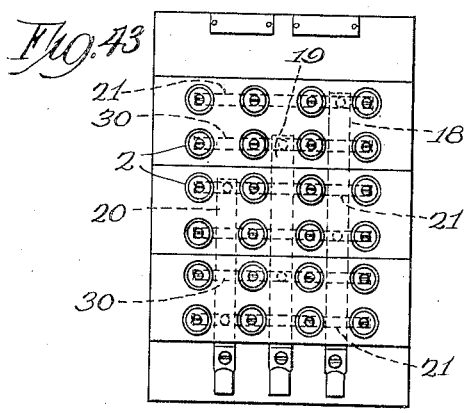
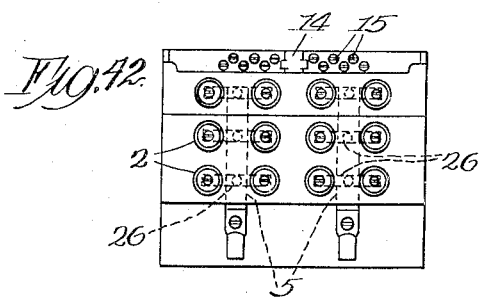
Inventor:
Reuben B. Benjamin
By Jones, Addington, Ames & Seibold
Attys Feb. 5, 1929.                                                    1,700,757
R. B. BENJAMIN
PANEL BOARD AND SWITCH CONSTRUCTION
Filed Feb. 11, 1926          10 Sheets-Sheet 10
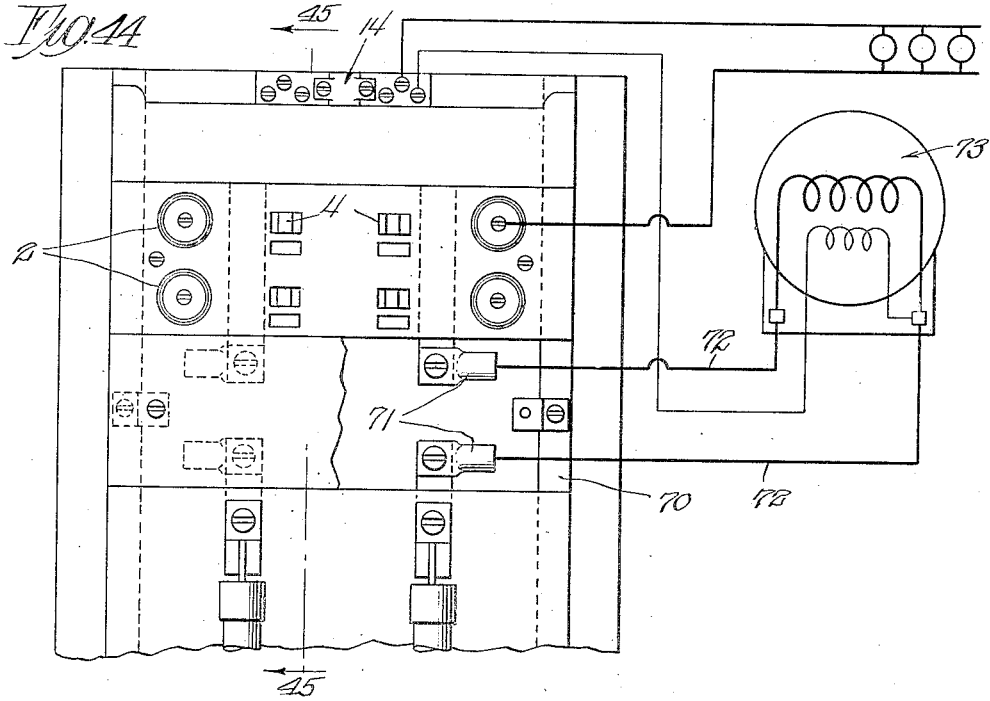
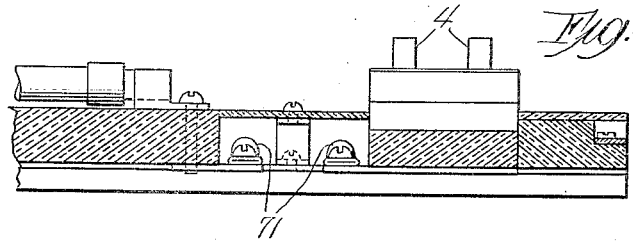
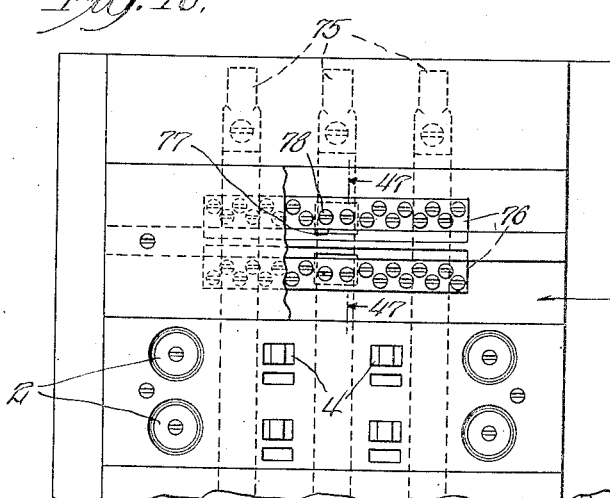
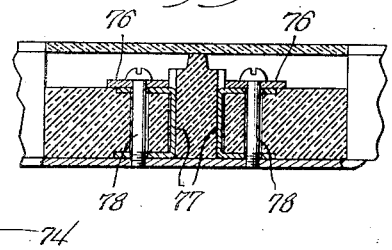
Inventor:
Reuben B. Benjamin
By Jones, Addington, Ames & Seibold
Attys Patented Feb. 5, 1929.

1,700,757

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

PANEL-BOARD AND SWITCH CONSTRUCTION.

Application filed February 11, 1926. Serial No. 87,499.

My invention relates to panel board and switch construction.

One of the objects of my invention is to provide an improved construction which can be readily adapted for various circuit arrangements.

A further object is to provide a cheap, durable construction.

Further objects will appear from the description and claims.

In the drawings, in which my invention is illustrated,

Figure 1 is a front view showing the cabinet for housing the panel board and switch construction;

Fig. 2 is a section on the line 2—2 of Fig. 1;

Fig. 3 is a section on the line 3—3 of Fig. 2;

Fig. 4 is a front view of the panel board in the cabinet, showing a three-wire single pole switch, double fuse circuit arrangement;

Fig. 5 is a section on the line 5—5 of Fig. 4;

Fig. 6 is a front view of the upper section of the panel board with parts broken away;

Fig. 7 is a section on the line 7—7 of Fig. 6;

Fig. 8 is a view similar to Fig. 6 but showing a three wire, single fuse circuit arrangement;

Fig. 9 is a section along the line 9—9 of Fig. 8;

Fig. 10 is a section along the line 10—10 of Fig. 8;

Fig. 11 is a horizontal section through a panel board section, showing a three wire, double fuse circuit arrangement;

Fig. 12 is a perspective view showing a name plate mounting;

Fig. 13 is a perspective view of one of the intermediate panel board sections;

Fig. 14 is a plan view of an intermediate section with the insulating cover removed and showing all the fuse receptacles of this section connected with the central bus bar for a two wire, single fuse circuit arrangement;

Fig. 15 is a section on the line 15—15 of Fig. 14;

Fig. 16 is a bottom view of Fig. 14;

Fig. 17 is a bottom view of a panel board section in which all four of the fuse receptacles in the upper horizontal row are connected with the right-hand bus bar and in which all four of the fuse receptacles in the lower horizontal row are connected with the left-hand bus bar for a two wire, double fuse circuit arrangement;

Fig. 18 is a section on the line 18—18 of Fig. 17;

Fig. 19 is a section on the line 19—19 of Fig. 17;

Fig. 20 shows in perspective three auxiliary bus bars used in making the connections for the various circuits.

Fig. 21 is a perspective view of a section provided with four fuse receptacles and four single pole switches, one for each fuse receptacle;

Fig. 22 is a plan view of the construction shown in Fig. 21, parts being removed;

Fig. 23 is a section on the line 23—23 of Fig. 22;

Fig. 24 is a perspective view of a conductor strip used in connecting one of the switch contacts with the bus bar;

Fig. 25 is a perspective view similar to Fig. 21, but showing two double pole switches substituted for the four single pole switches;

Fig. 26 is a plan view of the construction of Fig. 25, parts being removed;

Fig. 27 is a section on the line 27—27 of Fig. 26;

Fig. 28 is a perspective view of a conductor strip for connecting one of the switch contacts with its bus bar;

Fig. 29 is a sectional view of the single pole switch;

Fig. 30 is a bottom view of Fig. 29;

Fig. 31 is a sectional view of the double pole switch;

Fig. 32 is a bottom view of Fig. 31;

Fig. 33 is a sectional view on the line 33—33 of Fig. 22 showing the connections for the single pole switch construction;

Fig. 34 is a section on the line 34—34 of Fig. 26, showing the double pole switch connections;

Fig. 35 is a section on the line 35—35 of Fig. 26;

Fig. 36 is a diagrammatic view showing a three wire, single pole switch, double fuse circuit arrangement;

Fig. 37 is a diagrammatic view showing a two wire, double fuse circuit arrangement;

Fig. 38 is a diagrammatic view showing a three wire, single pole switch, single fuse circuit arrangement;

Fig. 39 is a diagrammatic view showing a three wire, double fuse circuit arrangement;

Fig. 40 is a diagrammatic view showing a three wire, double pole switch, double fuse circuit arrangement;

Fig. 41 is a diagrammatic view showing a two wire single fuse circuit arrangement;

Fig. 42 is a diagrammatic view showing a three wire single fuse circuit arrangement;

Fig. 43 is a diagrammatic view showing a three phase circuit arrangement;

Fig. 44 is a diagrammatic view showing a panel board construction having a metering section;

Fig. 45 is a section on the line 45—45 of Fig. 44;

Fig. 46 is a view showing a panel board construction having a feed-through section; and Fig. 47 is a section on the line 47—47 of Fig. 46.

By proper selection of the various panel board sections shown in detail in Figs. 6 to 35, inclusive, any of the various panel board assemblies shown diagrammatically in Figs. 36 to 42 may be built up.

Referring now to the various circuit arrangements in Figs. 36 to 42, inclusive, in the circuits shown in Fig. 36, which is a three-wire, single pole switch double circuit, the upper panel board section has mounted thereon four fuse receptacles 2 connected to the neutral bus bar 3 by an arrangement such as is shown in Fig. 7. The panel board section 3ª underneath the upper section carries four fuse receptacles 2 for the branch wires and four single pole switches 4, each controlling the circuit between one of the potential bus bars 5 and one of the fuse receptacles 2. The lower panel board section 6 carries the terminal lugs 7 for the main supply wires.

In the circuit arrangement of Fig. 37, the upper panel board section member 8 may carry simply a name plate such as shown in Fig. 12. The intermediate section 9 has mounted thereon an upper row of four fuse receptacles connected to the left-hand bus bar 10 by an arrangement such as is shown in Fig. 18 and a lower row of fuse receptacles connected with the right-hand bus bar 11 by an arrangement such as shown in the upper part of Fig. 17. The lower block 12 is simply the terminal lug block.

In the circuit shown in Fig. 38, which shows a three-wire single pole switch, single fuse circuit arrangement, the upper block carries simply the multiple binding plate 13 having the central binding terminal 14 for the neutral supply wire and the binding screws 15 for the unfused branch wires. The intermediate section may be the same as the intermediate section of Fig. 36, being provided with four fuse receptacles for the fused branch wires and four single pole switches 4, one for each of the fuse receptacles.

In the circuit arrangement of Fig. 39, which shows a three-wire double fuse circuit arrangement, the upper section has mounted thereon four fuse receptacles which are connected with the neutral and potential bus bars by an arrangement such as is shown in Fig. 11, the two inside receptacles being both connected with the neutral bus bar and the two outside fuse receptacles being connected with the potential bus bars, respectively. The intermediate section has mounted thereon eight fuse receptacles also connected with the neutral and potential bus bars by an arrangement such as is shown in Fig. 11.

In Fig. 40 which shows a three-wire double pole switch, double fuse arrangement, the upper section may carry simply a name plate, as in Fig. 37. The intermediate section has mounted thereon four fuse receptacles for the branch wires and two double pole switches 16 such as is shown in Fig. 25. This intermediate section is the same as the intermediate section of Figs. 35 and 38, except that two double pole switches are substituted for the four single pole switches. Each double pole switch effects a double break in series between one branch fuse receptacle and one of the potential bus bars 5 and between another branch fuse receptacle and the neutral bus bar 3.

In Fig. 41, which shows a two-wire single fuse circuit arrangement the upper section may be substantially as shown in Fig. 38 having a central wire terminal 14 for the supply wire and a plurality of binding screws 15 for the unfused branch wires. The intermediate section has mounted thereon eight fuse receptacles for the fused wires of the branch circuits, these being connected with a central supply bus bar 17 by an arrangement such as is shown in Fig. 15.

In Fig. 42 which shows a three wire, single fuse circuit arrangement, the upper section may be like that shown in Figs. 6 and 7, having mounted thereon a multiple binding plate for unfused branch wires and in addition four fuse receptacles for fused branch wires. However, in this form the fuse receptacles are connected with the potential bus bars 5 by an arrangement such as is shown in Fig. 9. The neutral supply wire is connected with the central wiring terminal 14 on the multiple binding plate, a plurality of binding screws 15 being provided for the connection of the unfused branch wires. The intermediate section has mounted thereon eight fuse receptacles which are connected with the potential bus bars 5 by an arrangement such as is shown in Fig. 9.

In Fig. 43 which shows a three phase circuit arrangement the upper section may carry simply a name plate. The next section underneath has mounted thereon eight fuse receptacles. The four fuse receptacles in the upper row of this section are connected with the right-hand bus bar 18 by an arrangement such as is shown in the upper part of Fig. 17. The four receptacles in the lower row of this section are connected with the intermediate bus bar 19 by an arrangement such as is shown in Fig. 15. The section next underneath has mounted thereon eight fuse receptacles, the four receptacles in the upper row being connected with the left-hand bus bar 20 by an arrangement such as is shown in Fig. 18, and the four fuse receptacles in the lower row being connected with the right-hand bus bar 18 by an arrangement such as is shown in the upper part of Fig. 17. The section next underneath has mounted thereon eight fuse receptacles, the four fuse receptacles in the upper row being connected with the central bus bar 19 by an arrangement such as is shown in Fig. 15, and the four fuse receptacles in the lower row being connected with the left hand bus bar 20 by an arrangement such as is shown in Fig. 18.

The various connections from the fuse receptacles to the main bus bars are effected by means of selectively usable transversely extending auxiliary bus bars, such as shown in Fig. 20, and by means of the alternatively usable interchangeable switch constructions shown in detail in Figs. 25 to 35, inclusive. I will describe first the selectively usable auxiliary bus bar arrangement. For connecting all four of the fuse receptacles in a horizontal row with either the right or left hand main bus bars, the auxiliary bus bar 21 is used, as shown in detail in Figs. 17 and 18 and diagrammatically in Figs. 37 and 43. It will be noted that the main bus bars lie in the same plane so that this auxiliary bus bar is provided with an offset portion 22 where it crosses the main bus bar and an insulating disk or plate 23 is placed between this offset portion and the main bus bar 5. The center contacts 24 of the fuse receptacles are screwed into the auxiliary bus bar 21, and a screw 25 connects the auxiliary bus bar 21 with the main bus bar 5. For connecting two adjacent fuse receptacles of a horizontal row with a bus bar located between them, the auxiliary bus bar 26 is used, as shown in detail in Figs. 9 and 11 and diagrammatically in Figs. 39 and 42. This is provided with offset ends 27 into which the center contact screws 24 of the fuse receptacles are threaded. For connecting the outside fuse receptacles of a horizontal row with the adjacent main bus bar the auxiliary bus bar 28 is used, as shown in Fig. 11. This has an offset portion 29 into which the center contact of the fuse receptacle is threaded and is secured to the main bus bar by a screw.

For connecting all four of the fuse receptacles of a horizontal row with a central bus bar, as shown in detail in Figs. 7, 14, 15 and 16 and diagrammatically in Figs. 41 and 43, an auxiliary bus bar 30 is provided, the central portion of which is secured to the central bus bar by means of a screw, the center contacts of all four of the fuse receptacles being threaded into the auxiliary bus bar.

Coming now to a description of the interchangeable switch construction shown in detail in Figs. 25 to 35, inclusive, this construction has provisions whereby the four single pole switches 4 can be readily removed from the panel board section, and two double pole switches 16 substituted therefor when a different circuit arrangement is desired.

Referring first to the single pole switch construction shown in Figs. 21, 22, 23, 24, 29, 30 and 33, this comprises four switch units 4 mounted on the base 31 between the two pairs of fuse receptacles 2 and above bus bars 3 and 5. Each switch unit controls the circuit between one of the side bus bars 5 and one of the fuse receptacles 2, by making or breaking the circuit at four points in series simultaneously.

Each switch unit comprises an insulating base 32, a switch contact 33 electrically connected with one of the side bus bars 5, a switch contact 34 electrically connected with the center contact 35 of the fuse receptacle 2, a pair of switch contacts 36 and 37 electrically connected with each other, and two sets of oscillatable bridging contacts, one set making and breaking connections between the contacts 33 and 36 and the other set making and breaking connections between the contacts 34 and 37. Each set of bridging contacts comprises a pair of spring contact members 38 secured to an insulating plate 39 oscillatably mounted at 40. These insulating plates are secured together to form a rigid construction by means of three connecting rivets 41 extending therebetween and riveted thereto. The bridging members are operated by means of an oscillatable switch lever 42 connected with one of the rivets by means of a coil tension spring 43. As the switch lever 42 is operated, it swings the tension spring from one side to the other of the dead center and causes the bridging members to oscillate with a snap action. In order to give a final kick-off to the bridging member in case it sticks, a pair of fingers 44 are provided on the switch lever which engage the spring as the switch lever is moved.

The two contacts 36 and 37 which are electrically connected with each other may be formed as an integral part of a metal stamping having a transversely extending portion 45 which provides the electrical connection. The other two contacts 33 and 34 are molded into the insulating base 32 and each is provided with a sleeve portion 46 through which a screw 47 may extend for securing it to the panel board. The screw 47 for the contact 33 which is electrically connected with the side bus bar 5 is threaded into this bus bar and to further insure a good electrical connection between the contact and the bus bar, a U-shaped conductor strip 48 (Figs. 24 and 33) is provided extending from the sleeve 46 to the bus bar 5. This strip is first formed as shown in full lines in Fig. 24 and after it is inserted in place in the base 31, has its end bent over, as shown in Fig. 33 and also in dotted lines in Fig. 24, to secure it in position. The sleeve portion 46 of the contact which is connected with the center contact 35 of the fuse receptacle, seats on an extension 49 of this center contact and is firmly held in engagement therewith by means of a securing screw 47 threaded into said extension.

The double pole switch construction shown in Figs. 25, 26, 27, 28, 31, 32, 34 and 35 is similar in many respects to the single pole switch construction just described. The bridging member and switch lever are exactly the same in both constructions as are also the contacts 33 and 34 on the right-hand side of Figs. 29, 30, 31 and 32. However, a pair of unconnected switch contacts 50 and 51 are substituted for the connected contacts 36 and 37 shown at the left of Fig. 29. Each of these unconnected contacts is provided with a foot portion 52, one of which is electrically connected with one of the side bus bars 5 by means of a conductor strap 48 on which foot portion 52 is clamped by means of a screw 53 which is threaded into the bus bar 5 and serves to secure the switch mechanism to the panel board. The other foot portion 52 is electrically connected with a side bus bar 5 by means of a conductor strap 54, against which the foot portion 52 is clamped by means of a screw 55 (Fig. 35), and a conductor strap 48 against which the other end of the conductor strap 54 is clamped by means of a screw 55ª threaded into the bus bar 5. Each of the contacts 33 and 34 is clamped against the extension of the center contact 35 by means of a screw 47 extending through the sleeve 46 of the contact and threaded into the extension of the center contact, as shown in Figs. 27 and 34.

As stated above, it will be noted that the panel board has provisions by means of which either single pole switches 4 or double pole switches 16 can be secured thereto. In the single pole construction the circuit is from one of the side bus bars 5 through either the screw 47 or the U-shaped conductor 48 to the sleeve 46, fixed switch contact 33 through the bridging members 38 to the contact 36, and through the transversely extending conductor 45 to the other contact 37, through the other set of bridging members 38 to the other fixed contact 34, and thence to the extension 49 of the center contact of the fuse receptacle. This single pole switch thus provides for four simultaneous breaks in series between the bus bar 5 and its associated fuse receptacle 2.

In the double pole switch construction one set of bridging members controls the circuit from one of the side bus bars 5 through either the screw 55 or the U-shaped conductor strap 48 to the conductor 54, through the fixed contact 50 and bridging members 38 to the fixed contact 33 with which the center contact 35 of the fuse receptacle is connected. The other set of bridging members controls the circuit from the central bus bar to the center contact of one of the fuse receptacles through the screw 53, contact 51, bridging member 38, and contact 34, which is electrically connected with the center contact of the fuse receptacle.

One side of the double pole switch thus effects a double break in series between an outside bus bar and the center contact of one of the fuse receptacles and the other side of the double pole switch effects a double break in series between the bus bar 3 and the center contact of another of the fuse receptacles.

Referring further in detail to the panel board and the various panel board sections, the construction shown comprises a sheet metal cabinet 56, in which the panel board is mounted, provided with a large door 57 which permits access to the entire panel board, and with a small door 58 which permits access to the switches for the branch circuits.

The sections of the panel board are mounted on vertical Z-bars 59 secured to the back of the cabinet by nuts 60 threaded on the studs 61. In the three-wire, single pole switch, double fuse circuit arrangement shown in Fig. 4, the two upper sections of the panel board have mounted thereon the fuse receptacles which are connected with the central neutral bus bar. The three sections underneath the upper two sections have mounted on the right-hand side the fuse receptacles and switches associated with the right-hand potential bus bar and on the left-hand side the fuse receptacles and switches associated with the left-hand bus bar. The fuse receptacles on the two upper sections are connected with the central neutral bus bar 3 by means of auxiliary bus bars 30 arranged as shown in Fig. 7, the auxiliary bus bar being secured to the neutral bus bar by means of the screw and the center contact screws of the fuse receptacles being threaded into the transversely extending auxiliary bus bars.

The threaded shell contacts 62 of the fuse receptacles are seated in deep recesses in the insulating base, shoulders being provided in each recess on which outwardly extending flanges or ears 63 of the shell contact rest. One ear or flange of each shell contact is provided with a binding terminal 64 to which a wire of the branch circuit is secured. The insulating base is provided with suitable passages for the branch wires leading from these binding terminals to the edge of the panel board. The construction of the switch carrying section is shown in detail in Figs. 21, 22 and 23 and has heretofore been described. Each single pole switch controls the circuit between one of the branch fuse receptacles and one of the potential bus bars.

If it is desired to use but a single fuse in each branch circuit, an arrangement such as shown in Figs. 6, 8, 41 and 42 may be used. In this arrangement, a multiple binding terminal construction is provided to which all of the unfused branch wires are connected, a central binding terminal construction 14 being provided for the main supply line. The panel board section which carries this multiple binding plate member also carries four fuse receptacles to furnish part of the fuses for the fused wires of the branch circuit. This multiple binding plate 65 may be mounted in a suitable recess 66 in the upper edge of the insulating base of the upper section; a plurality of binding screws 15 for the unfused branch wires are screwed into this binding plate.

In circuits such as shown in Figs. 37 and 40, where the upper section carries simply the name plates, these may be mounted on a cover member 67 supported on a bracket 68 resting on the Z-bars 59.

In order to cover up the wiring terminals and present a finished appearance, covers 69 of suitable sheet material may be provided in front of the panel board sections, this cover having openings for the fuse receptacles and switches, but covering the wiring terminals.

Figs. 44 and 45 show a three-wire single-pole switch single fuse circuit arrangement having a metering section 70 provided with terminal lugs 71 for the connections 72 for the meter 73, the arrangement otherwise being substantially as shown and described in connection with Fig. 38.

Figs. 46 and 47 show a three-wire single-pole switch single fuse circuit arrangement having a feed-through section 74 having terminal lugs 75 for connection with a succeeding panel board construction and having bus bars 76 for connection with the neutral branch wires which are electrically connected with the neutral supply bus bar by means of U-shaped clips 77 and screws 78 extending through openings in the branch bus bars and U-shaped clips and screwed into the neutral supply bus bar.

I claim:

1. A fuse receptacle and switch construction comprising a base, two potential bus bars and a neutral bus bar parallel to each other, the neutral bar being between the other two, a pair of fuse receptacles adjacent the negative bus bar, another pair of fuse receptacles adjacent the positive bus bars, and four independently operable switches, one for each fuse receptacle, for controlling the circuit between each fuse receptacle and its adjacent bus bar, said construction having provisions whereby the switches may be readily removed, and a pair of switches substituted therefor, each of which substituted switches controls the circuit between the neutral bus bar and one of the fuse receptacles and between a potential bus bar and another of the fuse receptacles.

2. A panel board construction comprising a neutral bus bar, a positive bus bar, and a negative bus bar, said bus bars extending parallel to each other, the neutral bus bar being between the other two, an insulating base member extending across said bus bars, a transverse row of four fuse receptacles mounted on said base section, and auxiliary bus bar means, whereby all of the receptacles in the row may be connected with the central neutral bus bar if desired, or whereby some may be connected with one potential bus bar and others with the other potential bus bar, if desired, or whereby some may be connected to the potential bus bars and the others to the neutral bus bar, if desired, all of said main bus bars and auxiliary bus bars being mounted on the rear face of said base.

3. A panel board construction comprising an insulating base having provisions for mounting thereon in parallel arrangement a positive bus bar, a negative bus bar and a neutral bus bar between the other bus bars, a transverse row of fuse receptacles mounted on said base section, and auxiliary bus bar means whereby all of the receptacles in a row may be connected with a neutral bus bar, if desired, or whereby some may be connected with one potential bus bar, and others with another potential bus bar, or whereby some may be connected to potential bus bars and some to a neutral bus bar, all of said main bus bars, and auxiliary bus bars being mounted on the rear face of said base.

4. A panel board construction comprising an insulating base having provisions for mounting thereon in parallel arrangement a positive bus bar, a negative bus bar, and a neutral bus bar between the other bus bars, a transverse row of four fuse receptacles mounted on said base section and auxiliary bus bar means whereby all of the receptacles in said row may be connected with one of said bus bars, if desired, or whereby some may be connected with one of said bus bars and others with another of said bus bars, all of said main bus bars and auxiliary bus bars being mounted on the rear face of said base.

5. A panel board construction comprising an insulating base having provisions for mounting thereon in parallel arrangement a positive bus bar, a negative bus bar, and a neutral bus bar between the other bus bars, a transverse row of four fuse receptacles mounted on said base section and auxiliary bus bar means whereby all of the receptacles in said row may be connected with one of said bus bars, if desired, or whereby some may be connected with one of said bus bars and others with another of said bus bars all of said main bus bars and auxiliary bus bars being mounted on the rear face of said base, said main bus bars lying substantially in the same plane and one of said auxiliary bus bars having a portion in contact with its supply bus bar, and an offset portion where it crosses another of the main bus bars.

6. A panel board construction comprising an insulating base having provisions for mounting thereon in parallel arrangement a positive bus bar, a negative bus bar, and a neutral bus bar between the other bus bars, a transverse row of four fuse receptacles mounted on said base section and auxiliary bus bar means whereby all of the receptacles in said row may be connected with one of said bus bars, if desired, or whereby some may be connected with one of said bus bars and others with another of said bus bars, all of said main bus bars and auxiliary bus bars being mounted on the rear face of said base, said main bus bars lying substantially in the same plane and one of said auxiliary bus bars having a portion in contact with its supply bus bar, and an offset portion where it crosses another of the main bus bars, and an insulating disk between said offset portion and said other main bus bar.

In witness whereof, I have hereunto subscribed my name.

REUBEN B. BENJAMIN.